United States Patent [19]

Steffen

[11] 3,899,626

[45] Aug. 12, 1975

[54] COMPOSITE ARTICLES BASED ON HEAT-RESISTANT RESINS

[75] Inventor: Joseph Steffen, Tassin, France

[73] Assignee: Rhone-Poulenc, S.A., Paris, France

[22] Filed: Sept. 7, 1973

[21] Appl. No.: 395,156

[30] Foreign Application Priority Data

Sept. 11, 1972 France .............................. 72.32138

[52] U.S. Cl. ................ 428/474; 156/308; 156/331; 428/116; 428/435; 428/458

[51] Int. Cl. ...... B32b 27/34; B32b 3/12; C09j 5/00

[58] Field of Search ...... 156/308, 331; 161/68, 197, 161/214, 227; 260/78 TF

[56] References Cited

UNITED STATES PATENTS

| | | | |
|---|---|---|---|
| 3,486,934 | 12/1969 | Bond | 117/218 |
| 3,553,054 | 1/1971 | Maus | 156/382 |
| 3,600,249 | 8/1971 | Jackson et al. | 156/197 |
| 3,712,933 | 1/1973 | Docloux et al. | 260/857 |
| 3,714,131 | 1/1973 | Hoback et al. | 260/78 TF |
| 3,759,779 | 9/1973 | Dumas | 156/331 |
| 3,811,997 | 5/1974 | Yuan | 161/68 |
| 3,821,054 | 6/1974 | Trostyanskaya et al. | 156/308 |

*Primary Examiner*—Charles E. Van Horn
*Assistant Examiner*—Robert A. Dawson
*Attorney, Agent, or Firm*—Stevens, Davis, Miller & Mosher

[57] ABSTRACT

A process for the manufacture of a composite article is provided which comprises stacking at least one layer (a) comprising a prepolymer of a bis-imide and a polyamine, and at least one layer (b) of a solid material, and then pressing the resulting stack, under the following conditions:

i. the layers are positioned such that when two or more layers (b) are used, said layers (b) are separated from each other by at least one layer (a);

ii. before the layers are positioned a polyamide-imide solution is applied over at least a part of the surfaces to be brought into contact such that when a surface of a layer (a) is to be positioned adjacent a layer (b) at least one of said surfaces is coated; and iii. the concentration of the polyamide-imide in the solution does not exceed about 70% by weight at the time of stacking. These articles are such that the layers adhere very well to one another.

14 Claims, No Drawings

COMPOSITE ARTICLES BASED ON HEAT-RESISTANT RESINS

The present invention relates to the manufacture of composite articles based on heat-resistant resin.

French Pat. No. 1,555,564 describes heat-resistant products produced by heating mixtures of bis-imides of unsaturated dicarboxylic acids and di-primary diamines, these components being employed such that there is a molar ratio of imide to diamine greater than 1. During the heating, the material passes through a stage which is usually called the prepolymer stage determined by the fact that the mixture dissolves in solvents, in particular polar solvents, and by the existence of a softening point, generally between 50° and 220°C. The shaping of these products is generally carried out at the prepolymer stage, subsequent heating of the prepolymers at a temperature which can be as high as 350°, optionally under pressure, leading to insoluble and infusible products, hereafter called resins, in contrast to the prepolymers mentioned above.

The prepolymers can be used alone or mixed with fillers in the manufacture of moulded articles. These prepolymers can also be used for impregnating woven or non-woven fibrous materials which are used for manufacturing laminates by stacking and heating under pressure these articles and optionally other substrates. The production of laminates from a single type of fibrous substrate impregnated with prepolymers does not present any difficulty; heating under pressure causes the prepolymer to soften or flow, thus ensuring cohesion of the laminate. In contrast, in the manufacture of composite articles i.e. where one of the layers is not all of partly prepolymer, it is necessary to combine an article consisting wholly or partially of the prepolymer with materials which can only adhere weakly to the prepolymer, even after the latter has been softened. This situation is encountered in, for example, the manufacture of printed circuits which are generally produced from composite articles consisting of a combination of metal foil and glass fabric impregnated with synthetic resin.

Composite articles comprising a metal foil and a polyimide substrate has been described in U.S. Pat. No. 3,486,934. According to this patent, in order to prepare such articles, a primer consisting of a solution of a polyamide-imide is applied to the metal foil, the layer thus deposited is dried, a polyimide precursor layer (polyamide-acid) is then applied and lastly the final stoving of the base-layer and of the polyamide-acid is carried out. This technique makes it possible to produce solid combinations with polyimides of the polypyromellitimide type produced from pyromellitic dianhydride and diaminodiphenyl ether. It has, however, been found that when it is desired to form composite articles from a prepolymer of the type described in French Pat. No. 1,555,564, the technique described in United States Patent does not always enable good quality combinations to be produced. In particular, in certain cases, peeling of the metal foil has been observed, i.e. detachment from the substrate after a dwell time of a few hours at 200°–250°C.

The present invention provides a process for the manufacture of a composite article by stacking and pressing at least one layer (a) consisting wholly or partially of a bis-imide and polyamide prepolymer and at least one layer (b) consisting of a solid material, the said stack being such that at least one layer (a) is inserted between two consecutive layers (b) if several layers of this type are present. This process is characterised in that, before stacking the layers of materials, a polyamide-imide solution is applied over all or part of the surfaces to be brought into contact, the arrangement of the coated faces being such that each pair, layer (a) and layer (b), possesses at its junction at least one coated face, and in that the stacking of the various layers (a) and (b) is carried out under conditions such that the concentration of the polyamide-imide solution present on the surfaces does not exceed 70% by weight at the time of stacking. As stated above, the layers (a) can consist solely of prepolymer or can consist of prepolymer and other materials, such as fillers, combined with the prepolymer either during its preparation or subsequently.

The term "bis-imide and polyamide prepolymer" as used herein generally denotes the product of the reaction, between 50° and 350°C., of an N,N'-bis-imide of an unsaturated dicarboxylic acid of the general formula:

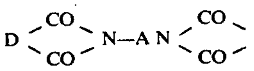
(I)

in which D represents a divalent organic radical containing a carbon-carbon double bond and A is a divalent organic radical possessing 2 to 30 carbon atoms, with a polyamine of the general formula:

$$R(NH_2)_x \quad \text{(II)}$$

in which $x$ is an integer at least equal to 2 and R represents an organic radical of valency $x$, 0.55 to 25 mols of bis-imide being used per molar $-NH_2$ group supplied by the polyamine.

This prepolymer possesses a softening point, which is generally between 50° and 220°C. depending on the nature and the properties of the reagents employed as well as on the duration and the temperature of the heating, and is soluble in various solvents such as cresols, dimethylformamide, N-methylpyrrolidone, dimethylacetamide, N-methylcaprolactam and chlorobenzene.

In formula (I), the symbol D is derived from an ethylenic dicarboxylic acid anhydride of the general formula:

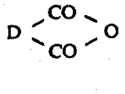
(III)

which can be, for example, maleic anhydride, citraconic anhydride, itaconic anhydride, pyrocinchonic anhydride and dichloromaleic anhydride as well as the products of a Diels-Alder reaction between one of these anhydrides and acyclic, alicyclic or heterocyclic diene. As regards these latter, reference can, for example, be made to volume IV of "Organics Reactions" (John Wiley and Sons, Inc.); tetrahydrophthalic anhydride and endomethylene-tetrahydrophthalic anhydride may be mentioned in particular.

The symbol A generally represents a linear or branched alkylene radical with less than 13 carbon atoms, or a phenylene, cyclohexylene,

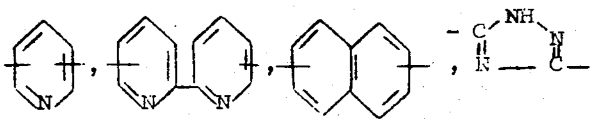

or

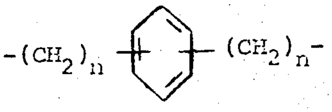

radical, wherein n represents an integer from 1 to 3. The symbol A can also comprise several phenylene or cyclohexylene radicals bonded to one another by a simple valency bond or by an inert atom or group such as —O—, —S—, an alkylene group with 1 to 3 carbon atoms, —CO—, $—SO_2—$, $—NR_1—$, —N=N—, —CONH—, —COO—, $—P(O)R_1—$, —CONH—X—NHCO—,

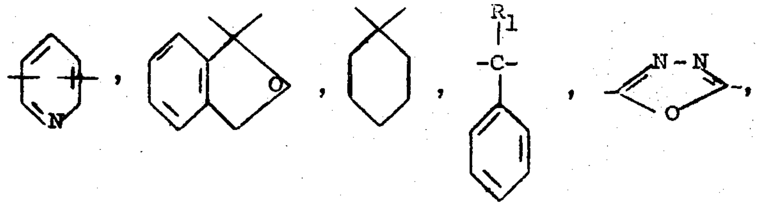

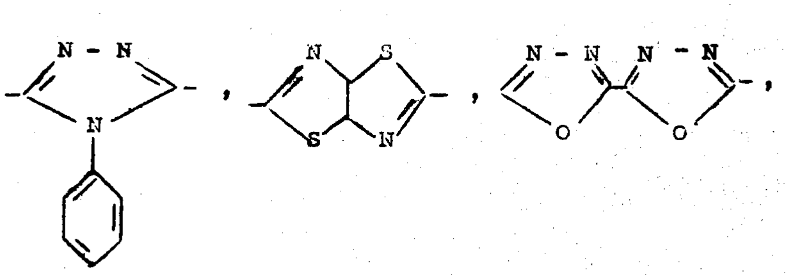

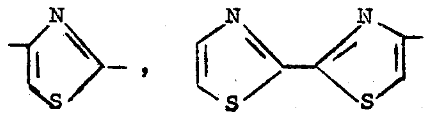

or

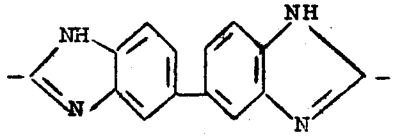

wherein $R_1$ represents a hydrogen atom, an alkyl radical with 1 to 4 carbon atoms, a phenyl radical or a cyclohexyl radical, and X represents an alkylene radical with fewer than 13 carbon atoms. The various phenylene or cyclohexylene radicals can be substituted by methyl groups.

Specific examples of bis-imides include: N,N'-ethylene-bis-maleimide, N,N'-hexamethylene-bis-maleimide, N,N'-meta-phenylene-bis-maleimide, N,N'-para-phenylene-bis-maleimide, N,N'-4,4'-diphenylmethane-bis-maleimide, N,N'-4,4'-(diphenyl ether)-bis-maleimide, N,N'-4,4-(diphenyl sulphone)-bis-maleimide, N,N'-4,4'-dicyclohexylmethane-bis-maleimide, N,N'-4,4'-(3,5-diphenyl-pyridine)-bis-maleimide, N,N'-pyridine-2,6-diyl)-bis-maleimide, N,N'-α,α'-4,4'-dimethylene-cyclohexane-bis-maleimide, N,N'-meta-xylylene-bis-maleimide, N,N'-para-xylylene-bis-maleimide, N,N'-4,4'-diphenyl-cyclohexane-bis-maleimide, N,N'-meta-phenylene-bis-tetrahydrophthalimide, N,N'-4,4'-diphenylmethane-bis-citraconimide, N,N'-4,4'-(1,1-diphenyl-propane)-bis-maleimide, N,N'-4,4'-(1,1,1-triphenylethane)-bis-maleimide, N,N'-4,4'-triphenylmethane-bis-maleimide and N,N'-3,5-(1,2,4-triazole)-bis-maleimide.

These bis-imides can be prepared following the methods described in, for example, U.S. Pat. No. 3,018,290 and British Specification No. 1,137,592.

The polyamine of formula (II) can be a diprimary diamine of the general formula:

$$H_2N—E—NH_2 \qquad (IV)$$

in which the symbol E represents one of the radicals defined under A. Examples of diprimary diamines which can be used include 4,4'-diamino-dicyclohexylmethane, 1,4-diamino-cyclohexane, 2,6-diamino-pyridine, metaphenylene-diamine, para-phenylene-diamine, 4,4'-diaminodiphenylmethane, 2,2-bis-(4-amino-phenyl)-propane, benzidine, 4,4'-diamino-phenyl ether, 4,4'-diamino-phenyl sulphide, 4,4'-diamino-diphenyl sulphone, bis-(4-aminophenyl)-methylphosphine oxide, bis-(4-amino-phenyl)-phenylphosphine oxide, N,N-bis-(4-amino-phenyl)-methylamine, 1,5-diamino-naphthalene, meta-xylylene-diamine, para-xylylene-diamine, 1,1-bis-(para-aminophenyl)-phthalane, hexamethylene-diamine, 6,6'-diamino-2,2'-dipyridyl, 4,4'-diamino-benzophenone, 4,4'-diamino-azobenzene, bis-(4- amino-phenyl)-phenylmethane, 1,1-bis-(4-amino-phenyl)-cyclohexane, 1,1-bis-(4-amino-3-methyl-phenyl)-cyclohexane, 2,5-bis-(m-aminophenyl)-1,3,4-oxadiazole,-2,5-bis-(p-aminophenyl)-1,3,4-oxadiazole, 2,5-bis-(m-aminophenyl)-thiazolo-(4,5-d)-thiazole, 5,-5'-di-(m-aminophenyl)-2,2'-bis-(1,3,4,-oxadiazolyl), 4,4'-bis-(p-aminophenyl)-2,2'-dithiazole, m-bis-(4-p-aminophenyl)-2-thiazolyl-benzene, 2,2'-bis-(m-amino-phenyl)-5,5'-dibenzimidazole, 4,4'-diamino-benzanilide, phenyl 4,4'-diaminobenzoate, N,N'-bis-(4-amino-benzoyl)-p-phenylene-diamine, 3,5-bis-(m-aminophenyl)-4-phenyl-1,2,4-triazole, N,N'-bis-(p-amino-benzoyl)-4,4'-diamino-diphenylmethane, bis-(4-p-amino-phenoxycarbonyl)-benzene, bis-p-(4-amino-phenoxy)benzene, 3,5-diamino-1,2,4-triazole, 1,1-bis (4-amino-phenyl)-1-phenyl-ethane and 3,5-bis-(4-aminophenyl)-pyridine.

Of the polyamines of formula (II) other than diprimary diamines, those which have fewer than 50 carbon atoms and which possess 3 to 5 $-NH_2$ groups per molecule are preferably used. The $-NH_2$ groups can be carried by, for example, a benzene ring optionally substituted by methyl groups, or by a naphthalene, pyridine or triazine nucleus; they can also be carried by several benzene rings connected to one another by a simple valency bond or by an inert atom or group which can be one of those described above in connection with the definition of the symbol A, or or 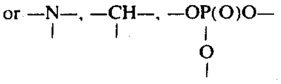

or

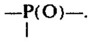

Examples of such polyamines include 1,2,4-triamino-benzene, 1,3,5-triamino-benzene, 2,4,6-triaminotoluene, 2,4,6-triamino-1,3,5-trimethyl-benzene, 1,3,7-triamino-naphthalene, 2,4,4'-triamino-diphenyl, 2,4,6-triaminopyridine, 2,4,4'-triamino-phenyl ether, 2,4,4'-triaminodiphenylmethane, 2,4,4'-triamino-diphenyl sulphone, 2,4,4'-triamino-benzophenone, 2,4,4'-triamino-3-methyldiphenyl-methane, N,N,N-tri-(4-amino-phenyl)-amine, tri-(4-amino-phenyl)-methane, 4,4',4''-triamino-phenyl orthophosphate, tri-(4-amino-phenyl)-phosphine oxide, 3,5,4'-triamino-benzanilide, melamine, 3,5,3',5'-tetraaminobenzophenone, 1,2,4,5-tetraamino-benzene, 2,3,6,7-tetraamino-naphthalene, 3,3'-diamino-benzidine, 3,3',4,4'-tetraamino-phenyl ether, 3,3',4,4'-tetraamino-diphenylmethane, 3,3',4,4'-tetraamino-diphenyl sulphone, 3,5-bis-(3,4'-diamino-phenyl)-pyridine and oligomers of the average formula:

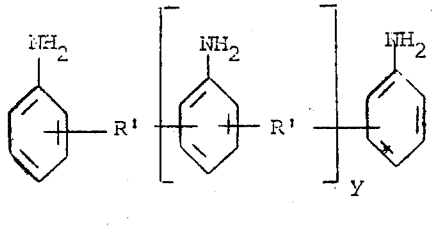

(V)

in which $y$ represents a number ranging approximately from 0.1 to 2 and R' represents a divalent hydrocarbon radical with 1 to 8 carbon atoms which is derived from an aldehyde or a ketone of the general formula:

$$O=R'$$

(VI)

in which the oxygen atom is bonded to a carbon atom of the radical R'; typical aldehydes and ketones are formaldehyde, acetaldehyde, benzaldehyde, oenanthal, acetone, methyl ethyl ketone, 2-hexanone, cyclohexanone and acetophenone. These oligomers possessing amino groups can be obtained in accordance with known processes such as those described in French Pat. Nos. 1,430,977, 1,481,935 and 1,533,696; the crude mixtures of oligomers produced according to these processes can be enriched in one or more of their constituents, for example by distillation under reduced pressure.

The preparation of the prepolymer can be carried out by heating the bis-imide and the polyamine, optionally mixed intimately beforehand, at between 50°C and 250°C. This can be carried out in bulk or in a polar solvent such as cresol, dimethylformamide, N-methylpyrrolidone, dimethylacetamide, N-methylcaprolactam or chlorobenzene. It is to be understood that it is possible to use a single bis-imide or a mixture of several bis-imides. Likewise, the term "polyamine" is intended to denote mixtures of polyamines with the same number of functional groups, or mixtures of polyamines, at least two of which possess a different number of functional groups. One or more diprimary diamines are generally used, optionally together with one or more polyamines with a higher number of functional groups which can suitably represent up to 50% by weight of the weight of the diamines employed. The amounts of reagents are preferably chosen so that there are 0.6 to 2.5 mols of bis-imide per molar $-NH_2$ group supplied by the polyamine.

The preparation of the prepolymers can be carried out in the presence of a strong acid. By the term "strong acid" as used herein is meant, in the Bronsted sense, monoacids or polyacids, at least one of the groups of which possesses an ionisation constant (pKa) less than 4.5. They can be inorganic acids such as hydrochloric, sulphuric, nitric and phosphoric acids, optionally substituted by an organic radical, such as sulphonic and phosphonic acids. They can also be carboxylic acids, it being possible for these to be of simple structure to possess radicals of formula D or to possess substituent groups which do not interfere with the reaction between the bis-imide (I) and the polyamine (II). Maleic acid is the preferred acid. Generally from 0.5 to 5% by weight of acid based on the weight of the bis-imide (I) employed are used.

As indicated above, the layer (a) can be formed, for example by moulding, from the prepolymer alone; it can also be produced from compositions containing fillers, such as those described in French Pat. No. 2,029,114. It is also possible to use a woven or non-woven fibrous material, impregnated with polymer; the impregnation can be carried out by using, for example, a suspension of the prepolymer such as that described in French Pat. No. 2,110,619. The fibrous reinforcement can be based on aluminium or zirconium silicate, aluminium or zirconium oxide, carbon, graphite, boron, asbestos or glass. In the case of glass, strands, filaments, cords or fabrics, such as satin or taffetas, formed from continuous fibres, can be used; filaments or fabrics resulting from the combination of discontinuous fibres can also be used. With such impregnated fibrous substrates, the layer (a) can consist of only one of these substrates or of several of these substrates superposed on one another.

The material of which the layer (b) consists may be of varied shape and nature. Foils or plates, the thickness of which can range from a few microns to several centimetres, can be used. Also materials with a cellular structure having a honeycomb structure or in the form of a cellular material [foam], can be used. The material can be essentially metallic, for example based on copper, zinc, aluminium, stainless steel, gold, silver, nickel or metal alloys such as nickel-chrome. It can also be of glass or based on cured or uncured synthetic resins, such as phenolic resins, epoxy resins or the resins described in, for example, French Pat. No. 1,555,564, it being possible for these resins to be used alone or together with fillers or fibrous reinforcements, such as those described above in connection with layer (a).

The polyamide-imides which are used to form the interface between layer (a) and layer (b) are generally those comprising a plurality of units of the formula:

$$-NH-Q-N{<}^{CO}_{CO}{>}Z-CO- \qquad (VII)$$

in which Q represents a divalent radical containing at least one benzene ring and Z represents a trivalent aromatic radical.

Examples of radicals Q include m-phenylene, p-phenylene and p,p'-diphenylene radicals or radicals of the formula:

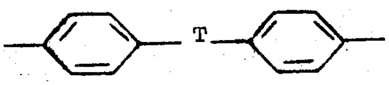

(VIII)

in which T represents a divalent atom or group such as —O—, $-CH_2-$, $-C(CH_3)_2-$, $-SO_2-$ or —N=N—.

Examples of radicals Z, include the trivalent radicals of the formulae:

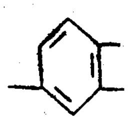 , 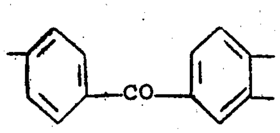 and

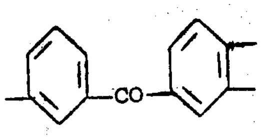

The polyamide-imides described above can be prepared according to various techniques, such as those described in British Specification Nos. 570,858 and 1,181,446, U.S. Pat. No. 3,260,691, and French Pat. Nos. 1,386,617, 1,473,600, 1,501,198, 1,559,357 and 1,576,844.

Particularly suitable polyamide-imides include those which are obtained from trimellitic anhydride and a difunctional derivative of the formula:

$$Y-Q-Y \qquad (IX)$$

in which Y represents a —NCO or $NHCOOR_2$ group, $R_2$ being an alkyl radical with 1 to 6 carbon atoms or a phenyl or methylphenyl radical. Examples of diisocyanates of formula (IX), include monocyclic diisocyanates such as diisocyanatotoluenes and bicyclic diisocyanates such as diisocyanatodiphenylmethane, diisocyanatodiphenylpropane and diisocyanatodiphenyl ether.

According to the present invention, polyamideimides produced from trimellitic anhydride and 4,4'-diisocyanatodiphenylmethane or 4,4'-diisocyanatodiphenyl ether are preferably used.

The polyamide-imides preferably have a reduced viscosity of between 30 and 180 $cm^3/g$, measured as a 0.5% by weight solution in 2-N-methylpyrrolidone.

The polyamide-imides are applied in the form of a solution. Polar organic solvents, such as 2-N-methylpyrrolidone, dimethylformamide, dimethylacetamide, dimethylsulphoxide, N-methylcaprolactam, a cresol, xylene or a mixture thereof are generally used as solvents.

The concentration of the polyamide-imide solutions is generally between 0.5 and 30%, preferably between 5 and 25%, by weight.

The polyamide-imide solution can be applied in various ways, such as application with a roller, with a brush or with a pouring device, spraying onto the article or immersion of the latter in the solution.

The amount of solution applied must be sufficient to wet the whole of the surface to be coated. It is usually not necessary to deposit an amount of polyamide-imide (by weight of dry resin) greater than 50 $g/m^2$; this amount is generally between 5 and 30 $g/m^2$.

The polyamide-imide solution is generally applied a short time before stacking the layers. It is necessary to carry out the stacking whilst the layer of polyamide-imide still contains at least 30% of solvent, preferably still at least 50%, by weight. It should be noted, however, that the usual solvents for polyamideimides are non-volatile solvents which only evaporate slowly at ambient temperature. Consequently, in the absence of heating, a relatively long period of time can elapse before reaching the abovementioned limiting concentration.

The stacks of at least one layer (a) and at least one layer (b), treated as indicated above, are generally pressed under 1.5 to 400 bars (absolute pressure) and heated at a temperature which can be as high as 350°C but which is generally between 100° and 280°C. The duration of pressing is usually between 30 minutes and 3 hours depending on the temperature. During this operation, the prepolymer changes into an insoluble and infusible resin.

The composite articles produced can be used directly or can be subjected to a post-stoving at a temperature up to about 300°C for up to, for example, 48 hours. The post-stoving is generally carried out for 12 to 24 hours at, say, 200°C.

These articles can be used in various applications such as in the manufacture of plate insulators for dry transformers, transformer blocks and engine slots, printed circuits and panels with a cellular structure, such as foams and honeycombs, or compressor vanes.

Laminates produced from bis-imide and polyamine prepolymer and from copper foils are particularly suitable for the manufacture of printed circuits. The laminates possess excellent adhesion of the copper foil to the resin resulting from crosslinking of the prepolymer.

The following Examples further illustrate the present invention.

EXAMPLE 1 a. Preparation of a glass fabric impregnated with prepolymer

A strip of glass fabric (taffeta type of specific gravity 200 $g/m^2$), which has previously been sized with $\gamma$-aminopropyltriethoxysilane, is impregnated with a solution of a polyimide prepolymer is 2-N-methylpyrrolidone (NMP) with a 52% solids content, the viscosity of which is 5 poises at 25°C.

The prepolymer used is prepared by reacting 4,4'-bis-maleimido-diphenylmethane with 4,4'-diaminodiphenylmethane $$\left(\text{molar ratio } \frac{\text{bis-imide}}{\text{diamine}} = 2.5\right);$$

this prepolymer softens at 90°C.

Coating of the fabric is carried out by continuous immersion in an impregnation tank containing the prepolymer solution; drying is carried out continuously in a vertical oven of height 6 m, heated to 150°C and ventilated at the rate of 2,000 $m^3$ of air per hour. The rate at which the strip of fabric passes is 500 m/hour.

The fabric thus impregnated contains 32% by weight of prepolymer and 2% of residual 2-N-methylpyrrolidone.

b. Preparation of a composite material 12 samples are cut out of the strip of preimpregnated fabric and are stacked on top of one another. The upper surface of this stack is brush-coated (at the rate of 10 g of solid material per $m^2$) with a 15% polytrimellitamide-imide solution in N-methylpyrrolidone. The polytrimellitamide-imide, the reduced viscosity of which is 90 $cm^3/g$, measured as a 0.5% by weight solution in N.M.P., is produced by reacting trimellitic anhydride with bis-(4-isocyanatophenyl)-methane.

An electrolytic copper foil of thickness 35$\mu$ is laid immediately on the coated surface of the stack. The whole is then placed under a press at 160°C with a pressure of 60 bars. After 15 minutes, the temperature is raised to 180°C, the pressure still being 60 bars, and this temperature is maintained for 90 minutes.

After cooling, the material produced is subjected to a test for peeling the copper foil, based on ASTM Standard Specification D1867 "Peel Strength Test"; the test is carried out on samples of width 22 mm, the temperature being 25°C and the rate of peeling being 26 mm/minute. A peeling force of 2.4 kg per 1 cm width is noted.

By way of comparison, the peeling force is 1.6 kg/cm if the upper surface of the prepolymer stack is not coated with the polytrimellitamide-imide solution. If the layer of polytrimellitamide-imide (residual solvent content: 25%) is dried before applying the layers, the the finished article produced has numerous blisters under the copper foil; furthermore, the peeling force cannot be measured.

EXAMPLE 2

The procedure of Example 1 is repeated, using a polytrimellitamide-imide solution of concentration 10% instead of 15% (weight of dry polymer: 7 $g/m^2$). The peel test on the finished artiicle produced records a peeling force of the copper foil of 2.4 kg/cm of width (temperature 25°C).

EXAMPLE 3

A pre-impregnate based on glass fabric is produced under the conditions of Example 1, with the following exceptions: the specific gravity of the glass fabric is 300 $g/m^2$, the concentration of the prepolymer solution is 45% and viscosity of this solution is 2 poises at 25°C.

The preimpregnated fabric contains 48% by weight of prepolymer and 4.5% of residual N.M.P.

A plate of thickness 15 mm with a honeycomb structure (open hexagonal cells, opening on both faces of the plate), made of glass fabric impregnated with a phenolic resin, is used.

Two preimpregnated fabrics as described above are placed, one above the other, on each face of the honeycomb plate, each of the preimpregnated fabrics coming into contact with the cellular plate having also received (on the honeycomb side) a layer of a 22% solution in N.M.P. of the polytrimellitamide-imide of Example 1 (weight of polytrimellitamide-imide deposited: 15 $g/m^2$).

The combination thus produceed is then placed under a press at 160°C under 2 bars for 15 minutes and then by 180°C, still under 2 bars, for 1 hour.

After cooling, an extremely strong combination is obtained. If an attempt is made to separate the plates situated on either side of the honeycomb, peeling of the impregnation resin takes place but not at the point of contact with these plates, rather the resin is separated from the glass fabric reinforcement.

If the application of the polytrimellitamide-imide solution is not carried out, the final combination is less strong; separation of the layers is much easier, in particular the impregnation resin of the glass fabrics does not remain attached to the honeycomb structure.

I claim:

1. Process for the manufacture of a composite article which comprises stacking at least one layer (a) comprising a prepolymer of a bis-imide and a polyamine, and at least one layer (b) of a solid material, and then pressing the resulting stack, under the following conditions:

i. the layers are positioned such that when two or more layers (b) are used, said layers (b) are separated from each other by at least one layer (a);

ii. before the layers are positioned a polyamide-imide solution is applied over at least a part of the surfaces to be brought into contact such that when a surface of a layer (a) is to be positioned adjacent a layer (b) at least one of said surfaces is coated; and iii. the concentration of the polyamide-imide in the solution does not exceed about 70% by weight at the time of stacking.

2. Process according to claim 1 in which the prepolymer has a softening point of between about 50° and 220°C and is the product of reaction of an N,N'-bis-imide of an unsaturated dicarboxylic acid of the general formula

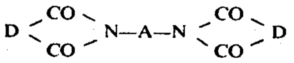 (I)

in which D represents a divalent organic radical containing a carbon-carbon double bond and A is a divalent organic radical possessing 2 to 30 carbon atoms, and a polyamine of the general formula:

$$R(NH_2)_x \quad (II)$$

in which $x$ is an integer at least equal to 2 and R represents an organic radical of valency $x$, about 0.55 to 25 mols of bis-imide being reacted per molar $-NH_2$ group supplied by the polyamine.

3. Process according to claim 2 in which the prepolymer is the product of reaction of N,N'-4,4'-diphenylmethane-bis-maleimide with 4,4'-diaminodiphenylmethane in a molar ratio $$\frac{\text{imide}}{\text{diamine}}$$

of between about 1.2 and 5.

4. Process according to claim 1 in which layer (a) consists essentially of a fibrous material impregnated with the said prepolymer.

5. Process according to claim 4 in which the fibrous material is a glass fabric.

6. Process according to claim 1 in which the polyamide-imide consists essentially of a plurality of units of the formula:

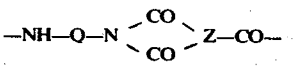 (III)

in which Q represents a divalent radical containing at least one benzene ring and Z represents a trivalent aromatic radical.

7. Process according to claim 6 in which Q is m- phenylene, p-phenylene, p,p'-diphenylene or a radical of the formula:

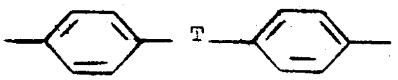

in which T represents $-O-$, $-CH_2-$, $-C(CH_3)_2-$, $-SO_2-$ or $-N{=}N-$ and Z represents

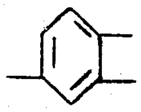 , 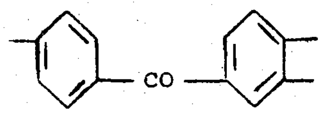

or

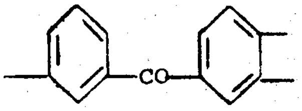

8. Process according to claim 1 in which the reduced viscosity of the polyamide-imide, measured as 0.5% by weight solution is 2-N-methylpyrrolidone, is between about 30 and 180 $cm^3/g$.

9. Process according to claim 1 in which the concentration of the polyamide-imide solution, at the time of application is between about 0.5 and 30% by weight.

10. Process according to claim 1 in which the polyamide-imide is used in an amount between about 5 and 30 g of dry polymer per $m^2$ of surface to be treated.

11. Process according to claim 1 in which layer (b) is a metal foil.

12. Process according to claim 1 in which layer (b) is an article with a honeycomb structure consisting of a glass fabric impregnated with phenolic resin.

13. Process according to claim 1 in which the pressing is carried out under an absolute pressure of between about 1.5 and 400 bars, at a temperature of between about 100° and 280°C.

14. A composite article manufactured by a process as defined in claim 1.

* * * * *